Sept. 11, 1956 H. B. CONANT 2,762,976
ELECTRICAL MEASURING INSTRUMENT
Filed Oct. 22, 1951

INVENTOR.
Harold B. Conant
BY
ATTORNEY.

United States Patent Office 2,762,976
Patented Sept. 11, 1956

2,762,976

ELECTRICAL MEASURING INSTRUMENT

Harold B. Conant, Lincoln, Nebr.

Application October 22, 1951, Serial No. 252,481

5 Claims. (Cl. 324—132)

This invention relates to electrical measuring instruments for determining alternating current values, the primary object being to eliminate the numerous sources of error commonly inherent in instruments of this kind heretofore produced.

It is the most important object hereof to provide in an electrical measuring instrument, an arrangement of electrical components for operating a direct current responsive device through application of alternating current whose values are to be determined, the arrangement and selection of such components affording a more accurate indication of the alternating current values and providing a more sensitive instrument than has previously been developed in this field.

An important feature of the present invention is the elimination of the objectionable features of common rectifier types of instruments by providing means other than rectification as such for converting alternating current into direct current, readable on a direct current responsive meter such as a D'Arsonval galvanometer or microammeter.

Another object hereof is to provide an instrument as above set forth that is not adversely affected to an appreciable extent by temperature changes, and that it not subject to errors due to frequency and waveform as well as non-uniformity with respect to the various voltage ranges in multi-range instruments.

This invention has as its basic principle, the utilization of resistive elements having non-linear, current-resistive characteristics to produce a direct current flow in a direct current device as a result of applying alternating current to the input terminals of the instrument.

A further aim hereof is to provide a bridge circuit for measuring alternating current values having a novelly arranged biasing circuit including a battery and a direct current meter, together with a potentiometer in parallel with the battery, the potentiometer preferably being of low resistance so that there is little resistance in series between the meter and the output terminals of the bridge.

Figure 1:
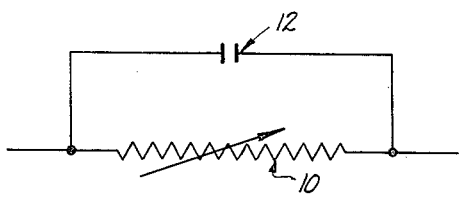
Figure 1 is a schematic wiring diagram showing the equivalent circuit of a metallic rectifier cell.

It is well known that in conventional rectifier-type instruments, the alternating current scales on the meter face are non-linear, due to the non-linear current-resistivity characteristics of the rectifier. In multi-range instruments which are in common use, only one of the several voltage ranges may be considered to be reasonably accurate. Lower voltage ranges are more non-linear than the printed scale while higher voltage ranges are less non-linear. As will hereinafter appear, with the proper amount of bias current, the instrument which is the subject of the present invention can be made to have a substantially linear alternating current scale which is reasonably accurate and uniform for all voltage ranges.

In the conventional full wave bridge rectifier type instrument employing four rectifying elements in the rectifier, it is possible to substitute resistors for one, two or three of the four rectifying elements and still obtain full wave rectification. Also, it is possible to employ one or two rectifying elements in half wave rectifier circuits. However, all of these possible variations and alterations of the basic full-wave bridge rectifier circuit are less efficient than the four element, full-wave bridge and produce less sensitive instruments.

For a great many years, direct current responsive devices have been actuated by alternating current in electrical measuring instruments through various arrangements of numerous types of rectifiers. For instance, in Pierce, U. S. Letters Patent No. 879,061, a Carborundum crystal, serving to rectify the alternating current, was connected to a D'Arsonval direct current meter. In conventional rectifier type measuring instruments, much of the frequency error results from the electrostatic capacity of the asymmetric cells when blocking current in the reverse direction.

Bossart, in U. S. Letters Patent No. 1,715,446, discloses an arrangement, now widely employed, and using copper oxide rectifiers with a direct current responsive device. Such basic circuit arrangements include four copper oxide rectifier cells within a full wave bridge circuit. The output of the circuit actuates the direct current meter upon connection of alternating current to the input terminals.

Despite its widespread use, the rectifier type of alternating current instrument is of limited utility due to the inherent electrical characteristics of the copper oxide rectifier commonly employed in this class of service.

First, the forward resistance of the copper oxide rectifier varies within wide limits depending upon the forward current. The internal voltage drop in the copper oxide rectifier varies approximately as the logarithm of the current flowing. Thefore, it is impractical to measure very small values of alternating current voltage because the internal resistance of the rectifier increases to such a high value that too small a deflection of the pointer of the direct current meter results.

Second, the rectifier type instrument is subject to serious errors as a result of changes in the ambient temperature. A temperature increase results in a decrease in both the forward and reverse resistances of the copper oxide rectifier cells and as these resistances are taken into account in the calibration of the instrument, any change of resistance will affect the accuracy of the instrument. With increasing temperature, the rate of resistance decrease is greater for the reverse than for the forward resistance so at high temperatures, the ratio of reverse to forward resistance and therefore, the rectification efficiency can reach very low values.

Third, the frequency response of the rectifier type instrument is not linear. That is, the indication of a given value of alternating current gradually decreases as the frequency of the alternations is increased. The reason for this decrease in rectification efficiency becomes obvious upon consideration of Figure 1 of the drawing which shows the equivalent circuit of a metallic rectifier cell.

In Figure 1, a variable resistance 10 represents either the forward or reverse ohmic resistance of the rectifier cell connected in parallel with a capacitor 12 representing the internal electrostatic capacity of the cell. With current flowing in the forward direction during rectification of low frequency current, the impedance of resistance 10 is low and the impedance of capacitor 12 is relatively high. With current in the reverse direction, the impedance of resistance 10 is high and the impedance of capacitor 12 in relation to resistance 10 is considerably lower than in the forward direction.

With an increase of frequency, the impedance of capacitor 12 becomes lower and therefore, decreases the impedance of the parallel resistance-capacitor circuit to a much greater extent in the reverse than in the forward direction. At a sufficiently high frequency the impedance of capacitor 12 may become as low as the forward resistance of resistance 10, at which frequency the rectifier is practically inoperative.

Another rectifier type of instrument is disclosed by Hoare et al., U. S. Letters Patent No. 2,288,399, wherein a direct current bias is caused to flow through the rectifier to facilitate the measurement of low values of alternating current potential. Because there is some similarity between the circuit proposed by Hoare, et al. and that of the present invention, the fundamental differences between them should be made clear.

In Hoare et al. the balancing potentiometer is connected in shunt with the meter whereas in the present invention, the potentiometer is placed in shunt with the source of direct bias current. This location of the potentiometer necessitates the connection of a resistor between the meter and the rectifier output whereas in the present invention, such a series resistor is unnecessary and would only serve to reduce the sensitivity of the instrument as it does in fact in the circuit proposed by Hoare et al. Furthermore, the presence of the potentiometer in shunt with the meter still further reduces the sensitivity of the instrument.

In the instrument which is the subject of the present invention, only the non-linear resistivity characteristic of the rectifier cells, if such are employed, is used to produce a direct current flow in the direct current instrument as a result of an alternating current applied to the instrument input terminals.

Figure 2:
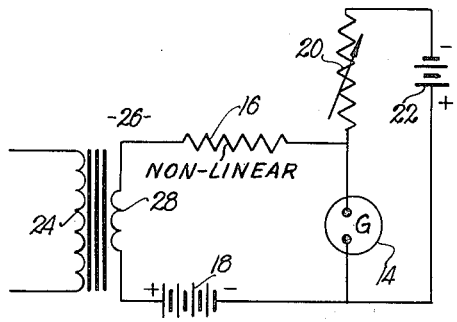
Fig. 2 is a schematic wiring diagram showing the basic mode of operation of the present invention.

The circuit shown in Fig. 2 of the drawings serves to illustrate the basic mode of operation of my invention wherein non-linearity resistance characteristics are employed to produce actuation of a direct current responsive device 14 as a result of application of an alternating current potential to the circuit. A non-linear resistor 16 may, for illustrative purposes, be considered to be a typical "Thyrite" element.

There are many substances and devices which exhibit a non-linear resistance characteristic. Although the degree of non-linearity varies considerably in the various substances and devices, the non-linearity is such that the voltage drop across the substance or device varies approximately as the logarithm of the current flowing in one or either direction. Common examples are Carborundum in the form of single crystals, copper oxide and selenium rectifier cells, termionic vacuum tubes and silicon and germanium diodes, all of which have rectifying properties.

If Carborundum is broken up into minute crystals and these are mixed with a ceramic binder and fired to fuse the binder, the resulting substance will exhibit the aforementioned non-linear resistance characteristic when acting as a conductor. But, because of the random orientation of the individual Carborundum crystals, the material has little or no rectifying properties. Such a material is commercially fabricated into elements of various sizes and shapes and sold under the trademark "Thyrite," see U. S. Letters Patent No. 1,622,742.

With the present invention, it is possible to employ rectifiers of the copper oxide, selenium, silicon, germanium or silicon carbide type or in fact, any resistive element having a non-linear current-resistivity characteristic. Accordingly, in the following description of my invention, I shall refer to "non-linear resistors" which shall be understood to mean any substance or device exhibiting the aforesaid non-linear resistance characteristic, whether or not the substance or device has rectifying properties. In fact, it is not necessary to employ rectifiers at all in the instrument hereof, although it may be desirable in some instances to use rectifiers, but only for the purpose of utilizing their non-linear forward resistance characteristics.

At a potential of 1 volt for a battery 18 (Fig. 2) or other suitable source of steady direct bias current, a current of approximately 80 microamperes will flow through resistor 16 and meter 14. This current in the meter 14 may be balanced out by an equivalent current through an ohmic resistance 20 from a battery 22 so that the pointer of meter 14 will remain on zero. Now, if an alternating current potential is applied to primary 24 of a transformer 26, sufficient to develop an alternating current potential of 1 volt across secondary 28 of transformer 26, this secondary potential will alternately add to and substract from the potential of battery 18. The resulting voltage appearing across non-linear resistor 16 will consequently vary between zero and 2 volts.

At zero volt across resistor 16, its resistance is practically infinity because it is conducting zero current and the balancing current supplied through resistor 20 from battery 22 tends to deflect the pointer of meter 14 in a backward direction. However, at 2 volts across resistor 16, its resistance drops considerably so that approximately 320 microamperes flow through the meter 14. Substraction of the 80 microamperes balancing current leaves 240 microamperes available to deflect the pointer of meter 14 in the forward direction.

Consideration of the foregoing indicates that operation of a direct current meter from an alternating current source has been accomplished without resorting to rectification. Rectification invariably involves the blocking of a reverse current or voltage and the foregoing consideration of Fig. 2 has shown that no reverse voltage appears across non-linear resistor 16.

If however, the alternating potential appearing across secondary 28 of transformer 26 should exceed the 1 volt used in the above example, a small reverse voltage would appear across resistor 16. In the case of the typical "Thyrite" element used in the illustration, the small reverse current is more than compensated by an increase in the forward current resulting from the non-linearity characteristic of resistor 16.

It is obvious that since no reverse current blocking is involved, the electrostatic capacitance of resistor 16 will have little effect on the accuracy of the indications of meter 14 at higher frequencies.

It is further obvious that any change in resistance of resistor 16 as a result of changes in the ambient temperature, may be readily compensated by changing the setting of resistor 20 to again return the meter 14 to zero. Since no rectification as such is involved, the loss of rectification efficiency when copper oxide rectifier cells are used, is of no consequence as these non-linear resistors retain their non-linearity characteristic to a greater or less degree at the highest temperatures likely to be encountered in the use of the instrument.

Choice of the specific form of non-linear resistor depends largely upon the service for which the instrument is designed. As the specific resistance of "Thyrite" is high, this material would not be the best choice for an instrument designed to measure extremely low values of alternating current potential. The better choice would be copper oxide rectifier cells for such service. "Thyrite" is ideal for a logarithmic scale instrument characterized by spreading out of the lower and closer spacing of the upper scale graduations. In such an instrument, it is easily possible to secure a readable indication of as little as 1 volt on a 100 volt full scale range. The logarithmic scale is the reverse of the so-called square law scale usually associated with rectifier type instruments. In any non-linear resistive element, there is a voltage drop corresponding to a given amount of current representing the point of best "non-linearity efficiency." That is, if the voltage drop is doubled, there will be for example, a fourfold increase in the current flowing in the resistive element whereas if the voltage is reduced to zero the current must likewise fall to zero. Therefore, if an alternating current voltage were placed in series with the bias voltage, the current increase in the direction of bias current flow would be four times as great as the decrease in the opposite direction resulting in what is in effect a pulsating direct current.

Figure 3:
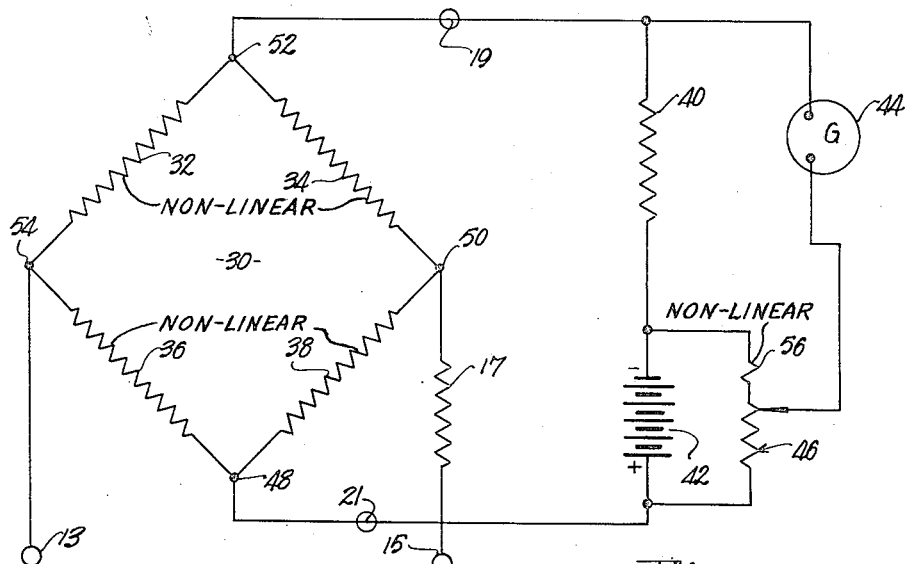
Fig. 3 is a schematic wiring diagram showing the circuit of the electrical measuring instrument hereof.

In Fig. 3, which is the preferred embodiment of my invention, the voltage of a battery 42 and the ohmic value of a resistor 40 are selected to produce the most efficient potential drop across each of four non-linear resistive elements 32—34—36—38, this drop being determined by the "non-linearity efficiency curve" of the particular resistance material employed.

Figure 3 of the drawings shows a four arm bridge 30 composed of the non-linear resistive elements 32—34—36—38, a source of direct current bias current composed of the ohmic resistance 40 and the battery 42, a direct current responsive device 44 and a balancing element, potentiometer 46. Input terminals 13 and 15 and direct current output terminals 19 and 21 are provided for bridge circuit 30, terminal 15 having a conventional multiplier resistor 17 therein if the instrument is designed for measurement of voltage.

A direct bias current flows from battery 42, divides substantially equally through the two current paths or branches 48—50—52 and 48—54—52 of the bridge 30 and returns to battery 42 through ohmic resistor 40. The value of the bias current depends upon the potential of battery 42, the ohmic resistance of resistor 40 and the resistance of non-linear resistors 32—34—36—38, said bias current being determined by the service which the instrument is required to perform and a consideration of graphs covering the non-linearity efficiency of the non-linear resistive elements involved.

With junction 48 as the common or zero reference point, the variable contact on potentiometer 46 is adjusted to the same potential as exists at junction 52 as a consequence of the potential drop across the bridge 30. This places meter 44 across points of equal potential and no current can flow through meter 44 so the pointer must necessarily rest on zero.

For the purpose of analyzing the circuit action of Fig. 3, suppose a direct current potential is applied across junctions 50 and 54 with junction 54 positive. As this applied direct current is increased from zero, the potential drops across arms 32 and 38 increase approximately as the log of the current increase in arms 32 and 38. At the same time the potential drops across arms 34 and 36 decrease in like proportion. As a direct result of the increase of current in arms 32 and 38 and the proportional decrease of current in arms 34 and 36, the resistance to the flow of the applied direct current offered by arms 32 and 38 is less than that offered by arms 34 and 36 with the result that a substantial portion of the applied direct current flows through meter 44 to produce a readable indication on the scale thereof.

As the applied direct current is still further increased, the potential of junction 54 will become more positive and that of junction 50 will become more negative until finally the potential of junction 54 is the same as that of junction 48 and that of junction 50 is the same as that of junction 52. At this value of applied direct current potential there exists zero potential across arms 34 and 36 and therefore, no current can flow so the resistance of arms 34 and 36 is so high (almost infinity with "Thyrite") that these arms may be considered to be out of the circuit entirely. Therefore, the applied direct current must flow through arm 32, divide through the bias-meter circuit and thence through arm 38. As the meter circuit is of much lower resistance than the bias circuit, it receives the greater portion of the current flow.

The foregoing analysis may be considered as the functions of the circuit of Fig. 3 during the positive half cycle of an applied alternating current potential. During the negative half cycle, junction 50 would be positive, the resistances of arms 34 and 36 would decrease, arms 32 and 38 would effectively drop out of the circuit and the resulting current flow through meter 42 would be in the same direction as on the positive half cycle.

Thus, the meter 42 receives what amounts to a pulsating direct cuurrent supplied by an alternating current applied to the circuit without any rectification as such having been employed.

Figure 4:
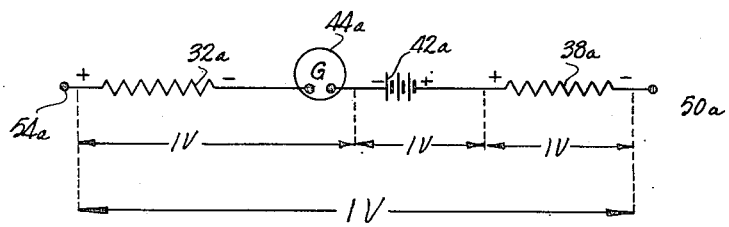
Fig. 4 is a circuit equivalent to Fig. 3 during one stage of operation.

In the conventional rectifier type instrument, the minimum applied A. C. potential which will produce a given meter deflection is equal to the total of the voltage drops across the active rectifier arms plus that across the meter. Fig. 4 of the drawings shows a circuit equivalent to that of Fig. 3 during the peak of the positive half cycle wherein arms 34 and 36 are effectively out of the circuit. Although the potential drops across arms 32a and 38a total 2 volts, the presence of the bias potential 42a effectively reduces the potential across junctions 54a and 50a to 1 volt. This effect enables the circuit of Fig. 3 to detect much lower values of alternating current potential than a convential rectifier type instrument.

During operation of the circuit of Fig. 3, the meter current flowing in potentiometer 46 causes the reference voltage setting of potentiometer 46 to become slightly more positive which in effect reduces the sensitivity of the instrument. This may be effectively overcome by a suitable non-linear resistor 56, connected in series with the negative end of potentiometer 46. The function of non-linear resistor 56 is to decrease resistance with increasing meter current to produce a shift of the voltage reference point on potentiometer 46 toward the negative to compensate for the shift toward the positive resulting from the meter current. This non-linear resistor 56 is however, not essential to the operation of my invention and may, if desired, be omitted.

Ohmic resistor 40 is shown as a fixed element but it may be desired in some designs to make this element adjustable. The potential of battery 42, the ohmic resistance of resistor 40 and of potentiometer 46 are selected according to the internal resistance and current sensitivity of meter 44 and the specific kind of non-linear resistive elements selected for arms 23—34—36—38 of the non-linear resistive bridge 30.

The electrical measuring instrument which is the subject of the present invention has almost limitless design possibilities due to the availability of a variety of non-linear resistive circuit elements and a wide range of meter sensitivities. The circuit may also be adapted to the operation of a great variety of direct current responsive devices other than direct current measuring instruments.

It is equally possible in the circuit, Fig. 3, to substitute ordinary ohmic resistors, capacitors, inductive reactors, transformer windings, etc. for one, two or three of the non-linear resistive elements comprising arms 32—34—36—38. It should be understood that any such alterations still utilize at least one non-linear resistive element as a means for translating an alternating current into a usable direct current. It would also be possible to omit the balancing potentiometer 46 in Fig. 3 by adjusting the meter 44 to mechanically depress the pointer thereof below the zero mark by an amount equal to the bias current. This would require placing the meter 44 in series with resistor 40. It has been found that instruments constructed according to Fig. 3 and variations thereof are substantially free of the errors commonly associated with rectifier type instruments.

As no reverse current blocking action is involved in this instrument, as is required in rectifier type instruments, no loss through capacitance effects occurs and the instrument is responsive to a wide range of frequencies.

The current in the meter 44 is not a true rectified current so the instrument is less subject to waveform errors. Whereas rectifiers commonly used in rectifier type instruments fall off in rectifying efficiency as the ambient temperature is increased, the instrument which is the subject of the present invention is less affected by temperature changes. Although the resistance of the non-linear resistance elements 32—34—36—38 changes with temperature changes, requiring re-setting of potentiometer 46 to zero the meter 44, they still retain their non-linear current-resistivity characteristic which in this instance is the characteristic employed to "rectify" the alternating current.

Having thus described the invention what is claimed as new and desired to be secured by Letters Patent is:

1. In electrical apparatus, a first electrical bridge arm circuit having a non-linear, electrical resistance element connected in series therewithin, a second electrical bridge arm circuit having a non-linear electrical resistance element connected in series therewithin, a third electrical bridge arm circuit having an electrical impedance element connected in series therewithin, a fourth electrical bridge arm circuit having an electrical impedance element connected in series therewithin, and means electrically coupling said bridge arm circuits in series in the order named in a closed circuit, whereby to present a non-linear, electrical bridge circuit; a pair of input terminals adapted for electrical coupling to an alternating current input, circuit means electrically coupling the first of said input terminals with the bridge circuit between the first and the second of said bridge arm circuits, and circuit means electrically coupling the second of said input terminals with the bridge circuit between the third and the fourth of said bridge arm circuits, whereby to present an alternating current input circuit for the bridge circuit; a pair of output terminals adapted for coupling to a direct current responsive device, circuit means electrically coupling the first of said output terminals with the bridge circuit between the first and the fourth of said bridge arm circuits, and circuit means electrically coupling the second of said output terminals with the bridge circuit between the second and the third of said bridge arm circuits, whereby to present a direct current output circuit for the bridge circuit; and a pair of electrical conductors having a source of direct current voltage connected in series therebetween, circuit means electrically coupling the first of said conductors with the bridge circuit between the first and the fourth of said bridge arm circuits, and circuit means electrically coupling the second of said conductors with the bridge arm circuit between the second and the third of said bridge arm circuits, whereby to present a biasing circuit for the non-linear bridge circuit, thereby adapting the bridge circuit for delivering to said output terminals a direct current output corresponding in magnitude with the magnitude of an alternating current input coupled with said input terminals, regardless of the wave form and frequency of said alternating current input.

2. In the invention as set forth in claim 1, wherein each of said impedance elements is a non-linear, electrical resistance element.

3. In the invention as set forth in claim 1, wherein is provided a linear, electrical resistor of predetermined resistance value, said linear resistor being connected in series with the circuit means that couples one of the conductors with the bridge circuit.

4. An electrical measuring apparatus for measuring alternating current values regardless of frequency and wave form comprising a first, a second, a third and a fourth bridge arm circuit, each bridge arm circuit respectively having a bidirectionally conductive, non-linear, electrical resistance element connected in series therewithin, said bridge arm circuits being connected in series in the order named in a closed circuit, whereby to present a non-linear, electrical, resistance bridge circuit; a pair of input terminals adapted for coupling to an external alternating current input, one of said input terminals being directly connected with the bridge circuit between the first and the second of said bridge arm circuits, and the other of said terminals being coupled with the bridge circuit between the third and the fourth of said bridge arm circuits, whereby to present an alternating current input circuit for the bridge circuit; a direct current responsive metering device; a pair of output terminals for the bridge circuit, one of said output terminals being directly connected with the bridge circuit between the first and the fourth bridge arm circuits, and the other of said terminals being directly connected with the bridge circuit between the second and the third bridge arm circuits, whereby to present a direct current output circuit for the bridge circuit; a linear resistor connected directly to said one output terminal; a bias voltage battery having a positive and a negative terminal, said negative terminal being connected directly to said linear resistor, and said positive terminal being connected directly to said other output terminal, whereby to dispose said linear resistor and said battery in series between said output terminals to present a biasing circuit for the non-linear resistance elements of the bridge circuit; a potentiometer having a movable tap, said potentiometer being coupled in parallel with said battery, whereby to present at said tap when the latter is suitably positioned a direct current potential of predetermined level with respect to said one output terminal; and means connecting said device directly between said one output terminal and said tap, whereby to render said device zeroable upon proper adjustment of said tap.

5. In the invention as set forth in claim 4, wherein is provided a non-linear resistor connected in series between said potentiometer and said negative terminal, whereby to compensate for any changes in voltage drop across the potentiometer resulting from changes in the current flowing through the latter.

References Cited in the file of this patent

UNITED STATES PATENTS

| 2,030,956 | Barker | Feb. 18, 1936 |
| 2,586,804 | Fluke | Feb. 26, 1952 |